United States Patent
Brenkus et al.

(10) Patent No.: US 6,296,488 B1
(45) Date of Patent: Oct. 2, 2001

(54) DIET METHOD AND APPARATUS

(76) Inventors: Jaime Brenkus, 2928 Sherbrooke Valley Ct., Willoughby Hills, OH (US) 44094; Kim Gorman, 2567 Sand Run Pkwy., Fairlawn, OH (US) 44333

( * ) Notice: Subject to any disclaimer, the term of this patent is extended or adjusted under 35 U.S.C. 154(b) by 0 days.

(21) Appl. No.: 09/528,374

(22) Filed: Mar. 17, 2000

Related U.S. Application Data

(60) Provisional application No. 60/151,710, filed on Aug. 31, 1999.

(51) Int. Cl.[7] .................................................. G09B 19/00
(52) U.S. Cl. .......................... 434/127; 40/324; 283/117; 206/561; 206/564; 206/459.5
(58) Field of Search ................................ 434/127; 40/324; 283/117; 220/555, 556, 575; 206/459.5, 561, 564, 541, 542

(56) References Cited

U.S. PATENT DOCUMENTS

| | | |
|---|---|---|
| D. 118,377 * | 1/1940 | Loveland . |
| D. 281,849 | 12/1985 | Cantor . |
| 3,532,247 * | 10/1970 | Bridges . |
| 3,799,386 * | 3/1974 | Madalin et al. . |
| 4,081,646 * | 3/1978 | Goltsos . |
| 4,310,316 | 1/1982 | Thomann . |
| 4,950,164 | 8/1990 | Lennon-Thompson et al. . |
| 5,338,202 | 8/1994 | Saari . |
| 5,560,653 * | 10/1996 | Beppu . |
| 5,925,390 * | 7/1999 | Kornacki .............................. 426/87 |

* cited by examiner

Primary Examiner—Jacob K. Ackun, Jr.
Assistant Examiner—Bena B. Miller
(74) Attorney, Agent, or Firm—Oldham & Oldham Co., LPA

(57) ABSTRACT

The present invention comprises a diet method which is designed to provide the user with a balanced diet while restricting the caloric intake by controlling the portion size in a simple and convenient manner. The method employs an apparatus which is preferably in the shape of a plate comprising a plurality of compartments which are designed to enclose a specified volume of food. The apparatus is used with associated meal cards having a variety of foods listed thereon. The foods are listed in specific sections on the card which correspond to the compartments of the apparatus. The meal cards are positioned such that the food list for a particular compartment fits in the shape of the compartment such that the user can see the selectable food items which may be used to fill the corresponding compartment. The user is provided with a simple method in which they do not have to weigh or measure the food amount, no calculating or recording is required, and decks of individual food items do not need to be bothered with.

1 Claim, 6 Drawing Sheets

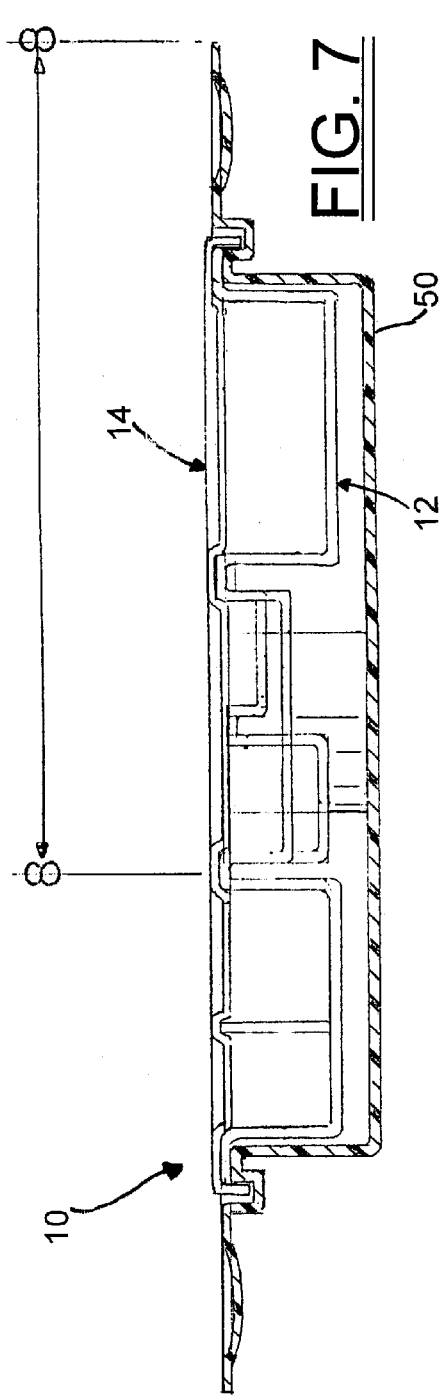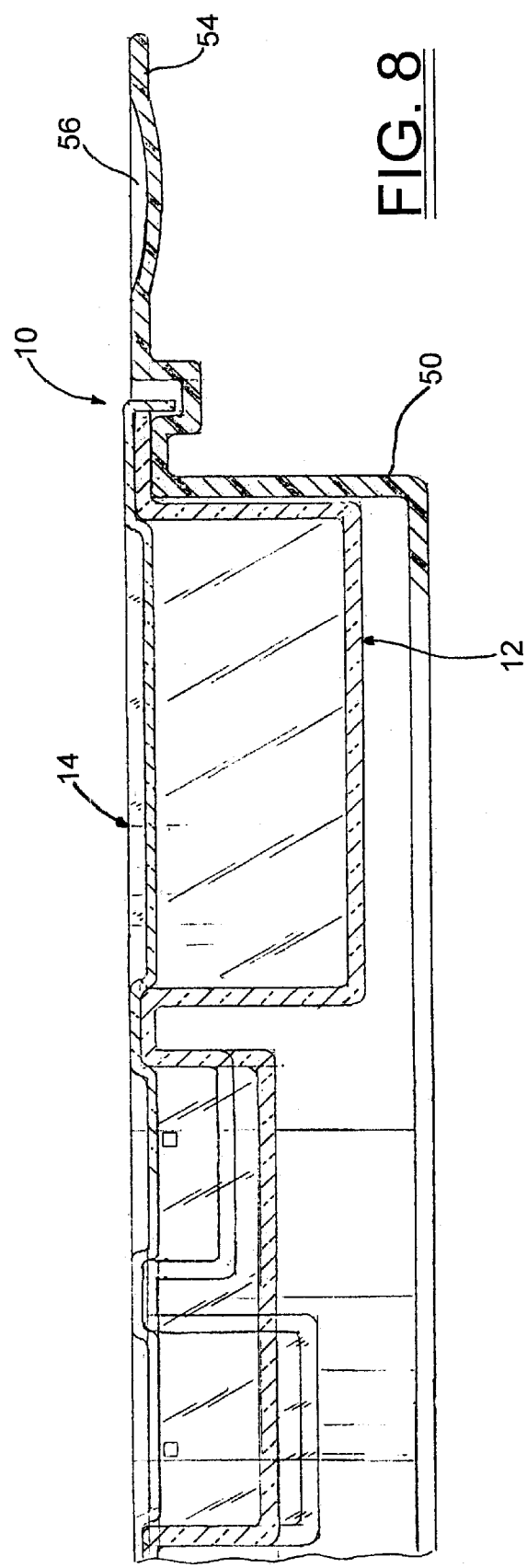

DIET METHOD AND APPARATUS

This Application claims benefit of Provisional No. 60/151,170 filed Aug. 31, 1999,

DIET METHOD AND APPARATUS

The present invention relates generally to a diet method primarily incorporating the use of a diet apparatus. More particularly, this invention relates to a diet method in which a compartmentalized plate is used to control the portion size, and includes a plurality of meal cards which determine the foods assigned to the specific compartments to provide a balanced diet and a predetermined target caloric intake.

BACKGROUND OF THE ART

There are numerous dietary plans and methods existing in the art. Many of these systems employ complicated calorie counting techniques which require the user to track every item consumed and carefully weigh and measure each portion. Newer plans have been developed that use color coded food cards associated with a meal plan that alleviate the need for counting and tracking calories. One such prior art system comprises a foldable carrying case having a plurality of pockets and pocket inserts on and in the inside walls of the carrying case having meal insert cards each identifying a specific meal type, i.e. breakfast; and having a plurality of food cards each listing one specific food and displaying a picture of either the approximate or visual serving size of the food. The user selects food cards each listing one specific food and places them in pockets for the type of the meal. The back sides of the cards display a picture of either the approximate or visual serving size of the food identified on the card and is used to measure the amount of the food. The problem with this type of visual approximation method is that the user is forced to guess about of the amount of food based on a picture on a two dimensional card. This approximation can result in the user estimating too high and having a larger serving and too much caloric intake whereas the diet is ineffective. The converse can result in the user not receiving the recommended daily allowances proscribed in the diet plan. In addition, the diet plan is too complicated in that each individual food item has its own card which must be located and placed in a particular pocket. Since each card is typically used for one food item, a large deck of cards must be maintained, searched and stored for each meal.

Accordingly, a need exists to provide a simple and effective diet method and apparatus for ensuring that the user consumes the proper food items at the proper portion size in order to ensure a balanced diet at a targeted daily caloric intake level.

SUMMARY OF THE INVENTION

The present invention is designed to provide a diet method which is designed to provide the user with a balanced diet while restricting the caloric intake by controlling the portion size in a simple and convenient manner. The method employs an apparatus which is preferably in the shape of a plate comprising a plurality of compartments which are designed to enclose a specified volume of food. The apparatus is used with associated meal cards having a variety of foods listed thereon. The foods are listed in specific sections on the card which correspond to the compartments of the apparatus. The meal cards are positioned such that the food list for a particular compartment fits in the shape of the compartment such that the user can see the selectable food item(s) which may be used to fill the corresponding compartment. The compartments and corresponding food lists are generally divided into the categories of carbohydrates, protein, fruit, vegetables and fat. The user is able to select any one item or combination of the items from the list associated with a particular compartment to fill the volume defined by the compartment. The different food categories and their related volumes ensure that the user is getting a balanced nutritional meal at a targeted caloric intake. The user is provided with a simple method in which they do not have to weigh or measure the food amount, no calculating or recording is required, and large decks of individual item food cards do not need to be maintained, searched, stored or otherwise bothered with.

BRIEF DESCRIPTION OF THE DRAWINGS

Better understanding of the present invention will be had when reference is made to the accompanying drawings, wherein identical parts are identified with identical reference numerals, and wherein:

FIG. 7 shows a sectional view through the assembly shown in FIG. 6 as taken in the direction of 7—7;

FIG. 8 shows an enlarged partial sectional view as taken between points 8—8 in FIG. 7

DETAILED DESCRIPTION OF THE DRAWINGS

Figure 1:
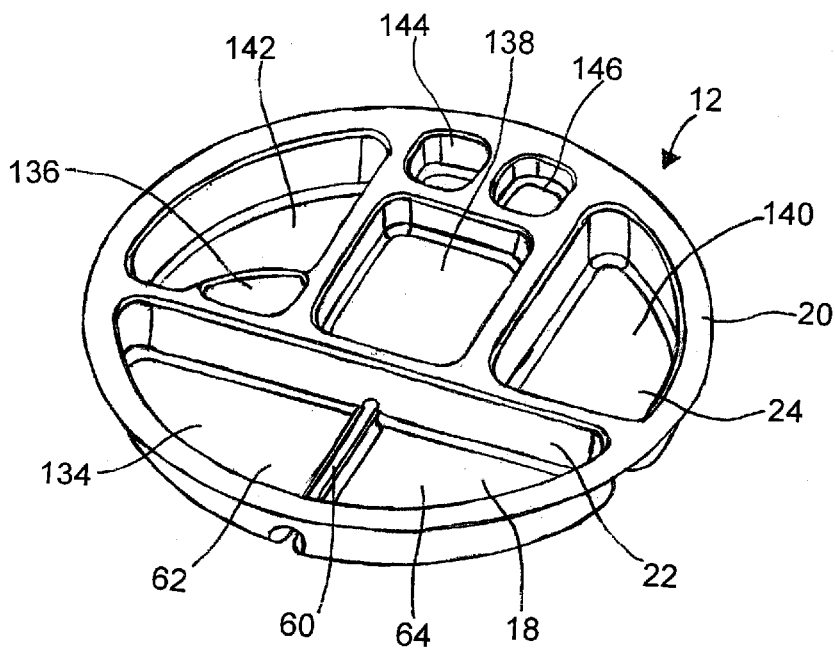
FIG. 1 shows a top perspective view of a compartmentalized plate of the present invention.
Figure 2:
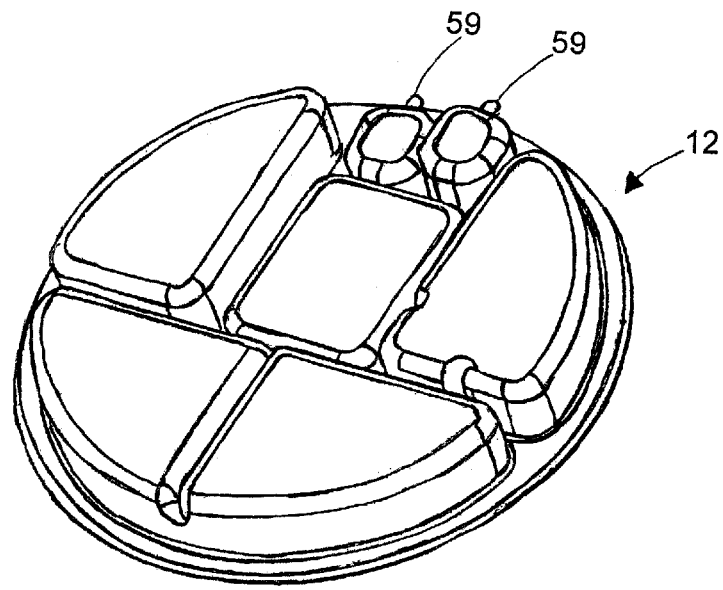
FIG. 2 shows a bottom perspective view of the compartmentalized plate shown in FIG. 1 of the present invention.
Figure 3:
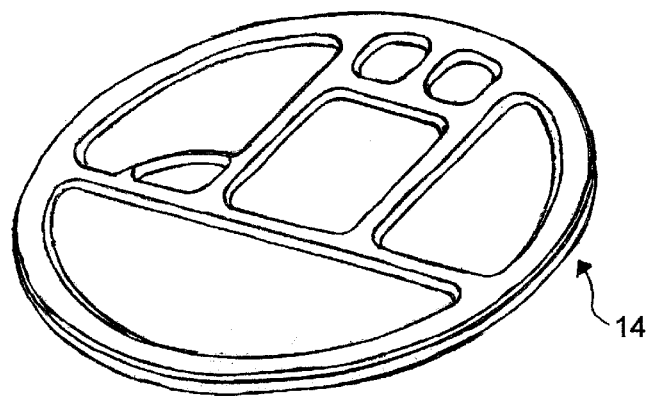
FIG. 3 shows shows a top perspective view of the plate cover member of the present invention.
Figure 6:
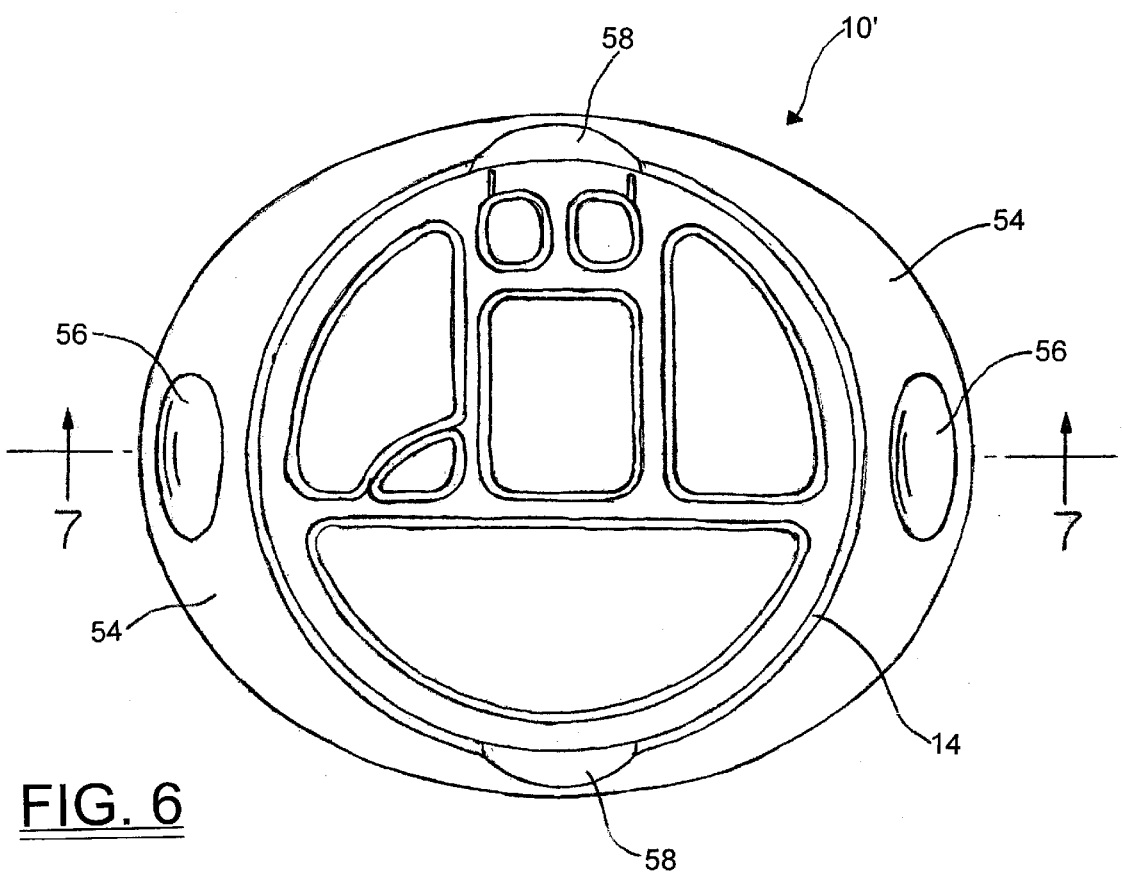
FIG. 6 shows a top perspective view of the combination of the plate, plate cover, and plate carrier.
Figure 4:
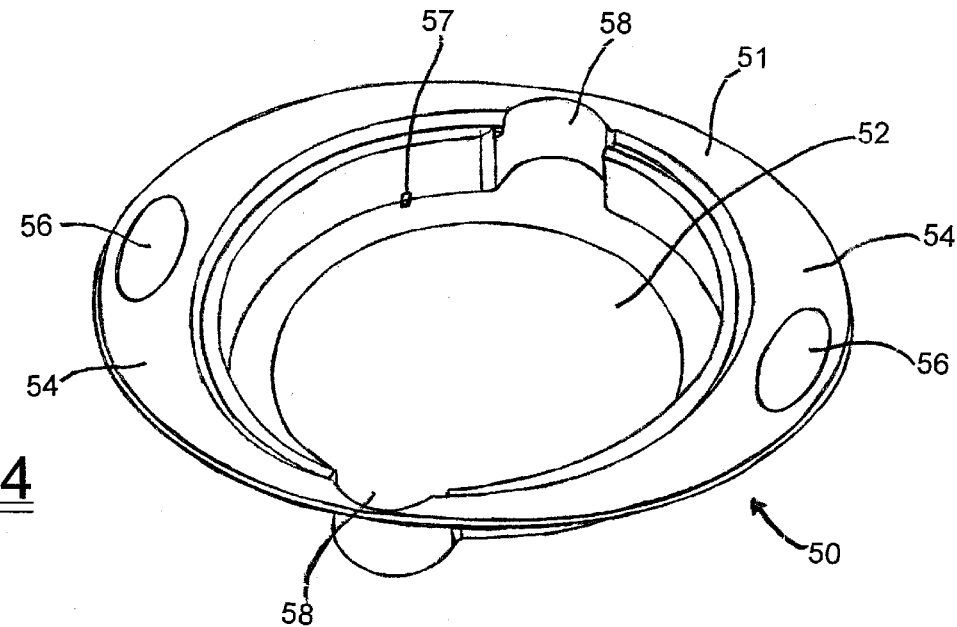
FIG. 4 shows a top perspective view of a plate carrier of the present invention.
Figure 5:
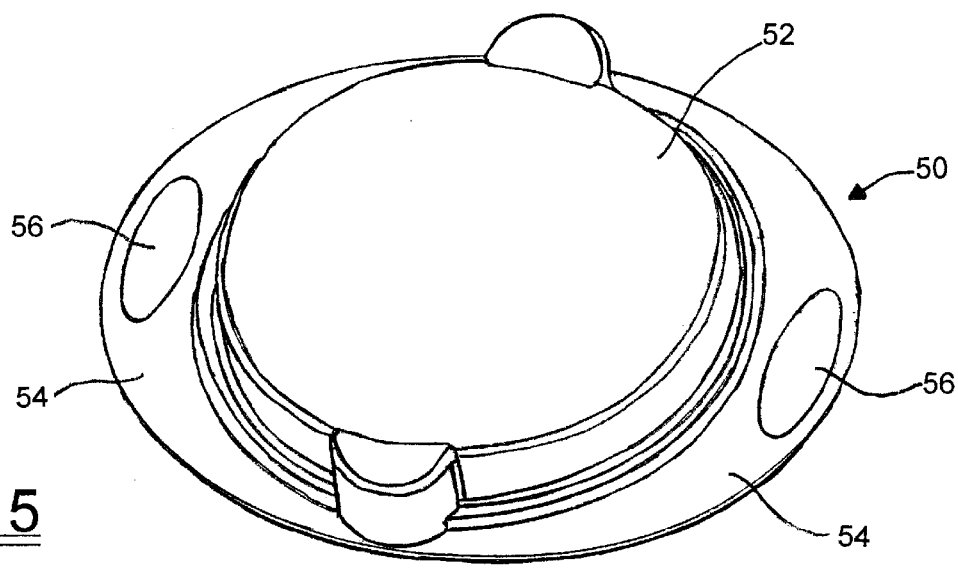
FIG. 5 shows a bottom perspective view of a plate carrier shown in FIG. 4 of the present invention.

A first embodiment of the present invention is depicted in FIGS. 1–3 and 9, wherein the apparatus 10 comprises a plate 12, a plate cover 14, and a meal card 30. The plate 12 has a plurality of compartments 18 formed as recesses from a generally horizontal top surface 20 of the plate 12. The compartments 18 generally comprise a side walls 22 and a bottom 24. The compartments 18 can be formed as recesses projecting downward from the top surface 20 of the plate 12. The individual compartments 18 are preferably of different shapes to enable them to fit on a smaller plate 12 and also different sizes and depths to provide a volume based on design criteria to be discussed below. Each of the compartments 18 are formed to a predetermined volume. The plate cover 14 fits flat and securely against the top surface 20 of the plate 12 to ensure that the portion size does not go beyond the designed portion volume. This prevents the user from heaping the portions in the compartments 18 beyond the top surface of the plate 12. The plate cover 14 is preferably made of a see-through plastic and snaps into place along the rim of the top plate 12 to secure the food within the apparatus 10. The apparatus 10 is preferably made of a plastic material such that the apparatus 10 is both firm and durable. It is preferred that the apparatus 10 is freezer safe, dishwasher safe and microwave safe as well as stain and scratch resistant. The apparatus 10 may be any shape including round, rectangular, oval or square.

Figure 9:
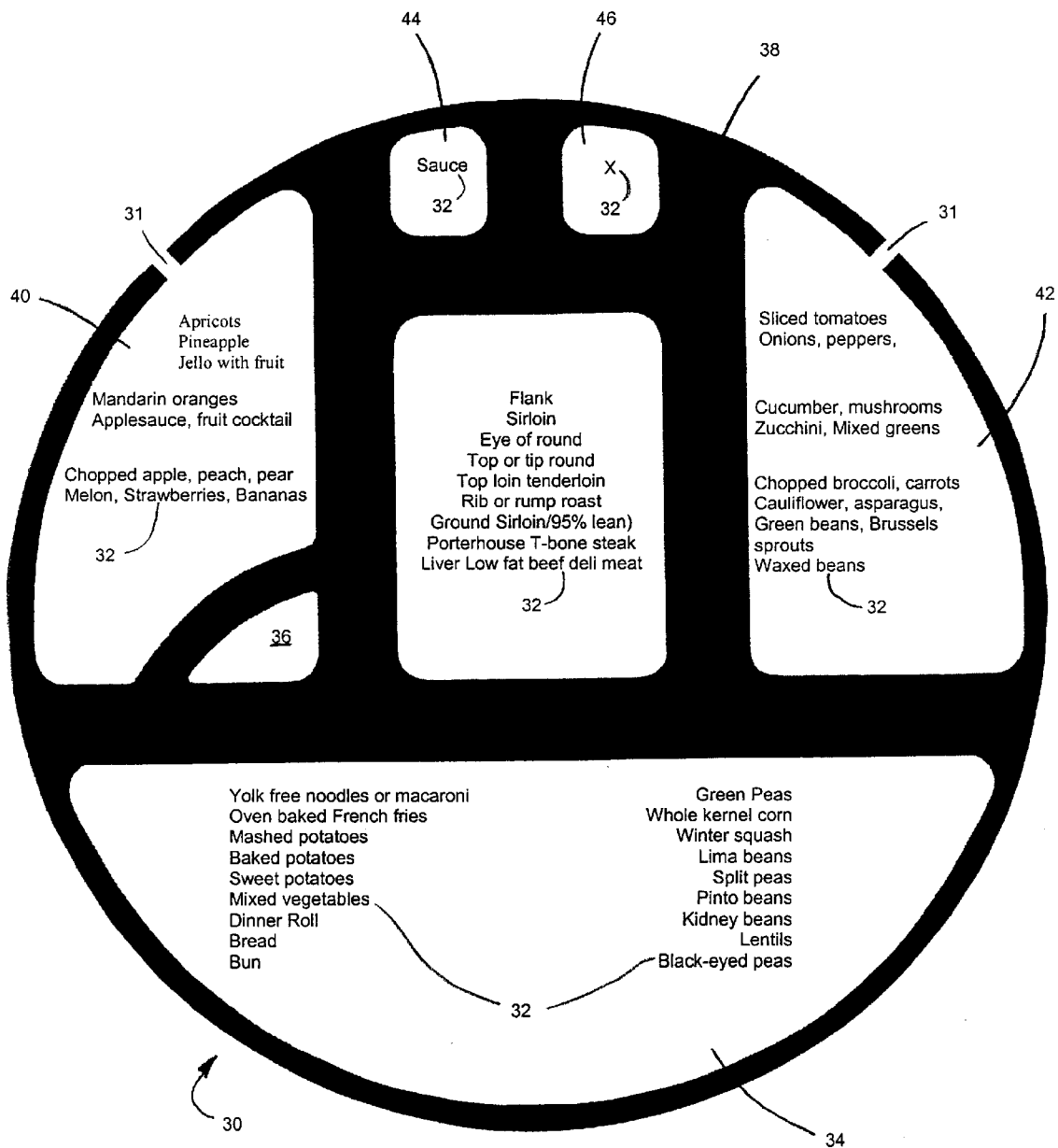
FIG. 9 shows a top view of a meal card used in conjunction with the plate of the present invention as shown in FIG. 1.

Referring now to FIG. 9, a meal card 30 of the present invention is shown. The meal card 30 comprises a plurality of food item lists 32 which generally correspond to the shape, size and relative location of each of the compartments 18. The corresponding assorted shapes and sizes of the compartments 18 and of the food item lists 32 ensure that the meal card 30 is properly aligned. The food item lists 32 are preferably divided into categories such as starches, or carbohydrates 34, 36, meat/fish, or proteins 38, fruits 40, vegetables 42, and fats 44, 46. The user selects one or more of the items from the food item list 32 and is limited only by the amount of food which can fit in that list's corresponding compartment 20. The meal cards 30 are tailored to have food item lists 32 that include foods that are typically prepared for breakfast, lunch or dinner. For example, one meal card 30 can be designed around a chicken/rice lunch, another card a beef/noodle dinner, another around a cereal breakfast, etc. All the meal cards 30 are designed to provide a balanced nutritional meal and a target calorie consumption level which is directly related to the volume of the compartments. If one meal card 30 contains higher calorie items, one or more of the fat food item lists 44, 46 will be deleted as represented by the "X" as shown in FIG. 9. An additional compensation technique is to substitute lower or higher calorie items in other food item lists 32 to compensate for a low or high calorie item. In this manner the calorie levels of all the meals can be adjusted to provide a relatively constant target calorie amount. The design of the meal card 30 food item lists 32 enables the user to hit the target calorie amount without having to calculate the weight or amount and calories of each individual food item. The design of the compartment volumes and of the foods offered on the meal cards 30 ensure that the target calorie level is achieved. The meal cards are preferably screen printed on both sides of a plastic sheet, such as polystyrene. Using both sides of the sheet will reduce the number of meal cards 30 needed. The plastic sheet will provide protection from foods and liquids which may be spilled on the meal cards.

Referring now to FIGS. 4–8, a second embodiment of the apparatus 10 including a tray or plate carrier 50 is shown. The plate carrier 50 is intended to provide a convenient carrying means for the plate 12. The plate carrier 50 generally includes a flat top surface 51 and a recess 52 which mates with a bottom 22 of the plate 12. The top surface 51 generally extends out in a flange or handle portion 54 on either side of the top surface 51. Each flange 54 has a depression 56 provide a gripping surface for the handle. The recess 52 also includes at least one access slot 58 to enable the user to stick their fingers underneath the plate 12 to remove the plate from the plate carrier 50.

In one embodiment of the present invention, a meal card 30 is inserted into the recess 52 of the plate carrier 50 and the plate 12 is placed over top of the meal card 30. The plate 12 is preferably made of a clear plastic material such that the food item lists 32 are visible through the corresponding compartments 18 formed in the plate 12. If the plate 12 and the plate carrier 50 have a circular or oval design, the plate may rotate in the carrier such that the food item lists 32 are not located underneath their associated compartments 18. One or more anti-rotation bosses 59 extending from the plate and/or the recess 52 of the carrier 50 will prevent rotation of the plate 12 within the carrier. Likewise the meal card 30 may have one or more anti-rotation slots 31 which mate with a corresponding boss 57 on the plate carrier 50.

While not shown, it is also contemplated that the plate carrier can be made of a transparent material such that the meal card 30 can be used as a place mat or simply attached to the base in a manner that the food item lists 32 are aligned and visible through the corresponding compartments 20 of the top plate 12. It is also contemplated that the meal card 32 can be used in conjunction with cover 14 or attached directly to the cover 14.

The diet methodology consists primarily of using the apparatus 10 including one of the various meal cards 30 for each meal of the day. The food items and the portions are controlled to provide a balanced nutritional meal at a specific daily calorie intake level. Without limiting the invention in any way, one calorie target level has been determined to be 500 calories a meal with three or four meals a day to provide daily target levels of 1500 calories per day or 2000 calories per day, respectively. To achieve this goal, the meals are designed and coordinated with the predetermined volumes of the plate 12. This requires that the foods selectable from the food item list 32 of the meal card 30 are coordinated such that the meal is as close as possible to the target calorie level for the meal. For example, if an item or group of items essential to a meal are particularly high in calorie content, the other selectable items are purposefully low in calorie content. In some cases, one or more of the compartments are deleted such that no food items associated with these compartments are shown as selectable or the area may be shown as deleted with an "X". The meal cards 30 and/or the volumes of the compartments 18 can be designed for any calorie target level and customized for a particular type of individual or for a specific individual.

Referring now to the individual compartments of the plate in FIG. 1, it is noted that the shape and location of each compartment can be changed without departing from the scope of the invention. Additionally, the volumes of the compartments can be designed to be larger or smaller to correspond to a particular caloric intake level when used in conjunction with the meal cards 30. Accordingly, and without limiting the invention in any way, the compartment 134 at the bottom half of the dish is typically reserved for starches, or carbohydrates. The volume of the compartment 134 is about one and one quarter cups. The upper right generally triangular compartment 140 is typically reserved for fruits while the upper left generally triangular compartment 142 is typically reserved for vegetables. The volume for each compartment is about one half of a cup. The small compartment 136 separated from the upper left compartment section 142 is typically reserved as an additional carbohydrate section. This small compartment 136 is ideal for syrup, honey or the like for use with breakfast meals. The central rectangular compartment 138 is typically reserved for meat/fish, or proteins and has a volume corresponding to approximately a two ounce serving of meat. The small square compartments 144, 146 at the top of the plate are typically reserved for fats. One of the fat 144 compartments has a volume of about one tablespoon while the other fat compartment 146 typically has a volume of one teaspoon. The meal cards and the plate are designed to provide the proper food portion size for a balanced, nutritional meal at a specific caloric intake level.

The compartments 18 may also be designed to include section dividers 60 which are used to allow smaller portions of food items to be assigned to each divided portion as shown in the starch or carbohydrate compartment 134. The divider 60 shown is not full height as it does not extend upward to the top surface 20 of the plate 12. The dividers 60 can optionally be designed to be full height. It is also contemplated that temporary dividers, not shown, can be used and inserted into a compartment to divide a particular compartment 18 for specific meals. The sub-dividers 60 can be used to separate a large compartment 18 into two smaller sections 62, 64 to segregate different food items. The divider 60 can also be used to limit a portion of a particular food item within the original compartment 18. For example, an item or group of items essential to a meal might be particularly high in calorie content such that if the entire compartment 18 was filled with that item, the meal would not meet the target calorie amount. In this case, the opposite side would either be shown as deleted with an "X" or would have a food item list with very low calorie items assigned to it. The dividers 60 help control the portion amounts as well as prevent mixing of items which would be unappetizing if allowed to mix in the same compartment 18. In addition, the dividers 60 can be used to add a greater variety of food item lists 32 to be used on the meal card 30 to provide additional menu selections.

Figure 10:
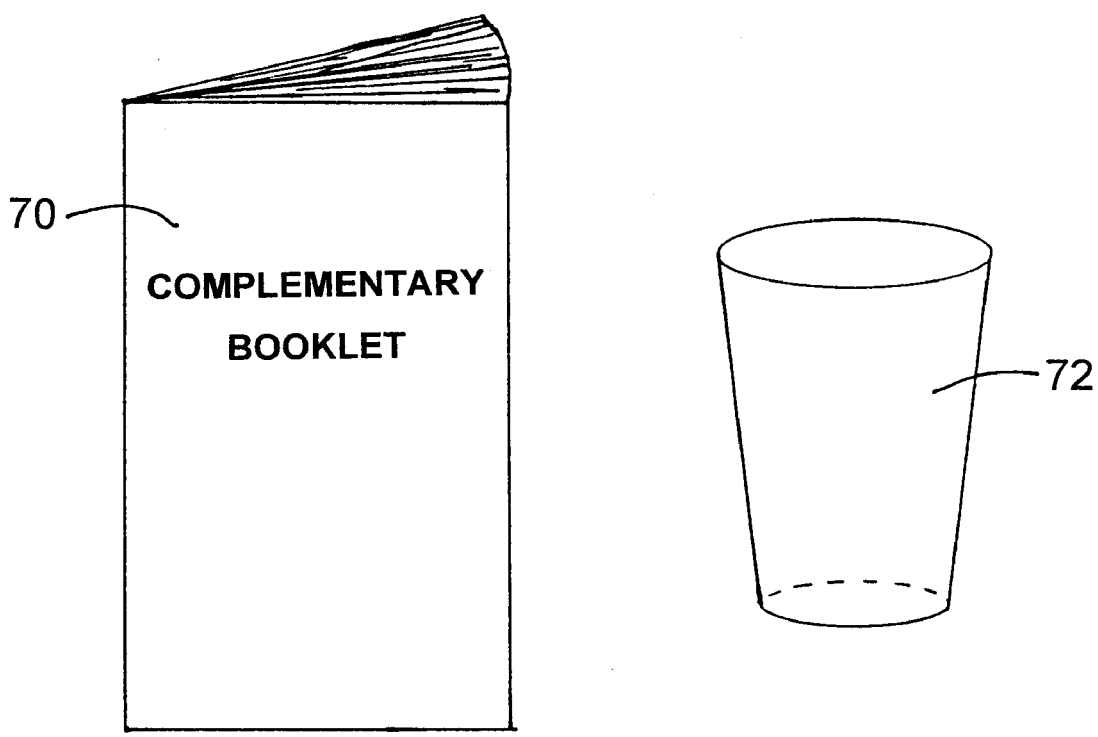
FIG. 10 shows a complimentary booklet and standard eight ounce cup in accordance with the present invention.

In another embodiment, the diet method also includes a compliment booklet 70 which is shown in FIG. 10. The compliment booklet 70 provides instruction as to the amount and types of fluids which can be consumed. An eight ounce cup 72 is also provided to ensure that the amount of liquid containing calories is known to the user. The compliment booklet 70 also provides a list of snacks which can be consumed to compliment the diet. In one embodiment of the present invention, the compliment booklet 70 includes a selection of low calorie foods which can be consumed on an unlimited basis because they have minimal calorie levels. A second category of moderate level calorie snacks and a third category of higher calorie snacks are also provided. These are included to provide the consumer with awareness of the additional calorie intake should the user decide to consume these snacks.

Although the present invention has been described above in detail, the same is by way of illustration and example only and is not to be taken as a limitation on the present invention.

What is claimed is:

1. A diet method of specifying food items and food portion volume comprising:
   a) providing an at least partially transparent dish having compartments of predetermined volume;
   b) providing at least one menu card having items of food listed thereon and corresponding to said compartments;
   c) providing a plate carrier;
   d) inserting said at least one menu card into a recess of said plate carrier;
   e) inserting said dish into said recess in said carrier such that said menu card is visible through at least said dish;
   f) filling said compartments with food selected from said at least one menu card; and
   g) covering said dish with a cover to prevent over filling of said compartment.

* * * * *